United States Patent [19]
Thompson

[11] Patent Number: 5,917,828
[45] Date of Patent: Jun. 29, 1999

[54] ATM REASSEMBLY CONTROLLER AND METHOD

[75] Inventor: Derek Andrew Thompson, San Diego, Calif.

[73] Assignee: NCR Corporation, Dayton, Ohio

[21] Appl. No.: 08/778,536

[22] Filed: Jan. 3, 1997

[51] Int. Cl.⁶ .................................................. H04L 12/56
[52] U.S. Cl. .......................... 370/474; 370/395; 370/392; 370/397
[58] Field of Search ................................... 370/395, 474, 370/397, 392, 471

[56] References Cited

U.S. PATENT DOCUMENTS 5,604,743  2/1997  Le Guigner et al. .................... 370/392
5,633,867  5/1997  Ben-Nun et al. ........................ 370/399
5,751,698  5/1998  Cushman et al. ........................ 370/397

Primary Examiner—Jeffery A. Hofsass
Assistant Examiner—Rafael A. Perez-Pineiro
Attorney, Agent, or Firm—Merchant & Gould

[57] ABSTRACT

An ATM reassembly controller is disclosed that optimizes the utilization of host memory space and hardware resources such as I/O bus bandwidth, host memory bandwidth, memory system bandwidth and CPU resources. The system combines, whenever possible, the PDU status, PDU data and pointers to the host memory data buffers into a large burst write to the status queue. In addition, multiple status bundles are packed into a host memory buffer for efficient use of memory. An additional benefit of combining and packing information is that CPU resources are conserved by having combined the information the CPU must access into to a contiguous memory area.

27 Claims, 9 Drawing Sheets

FIG. 2 PRIOR ART
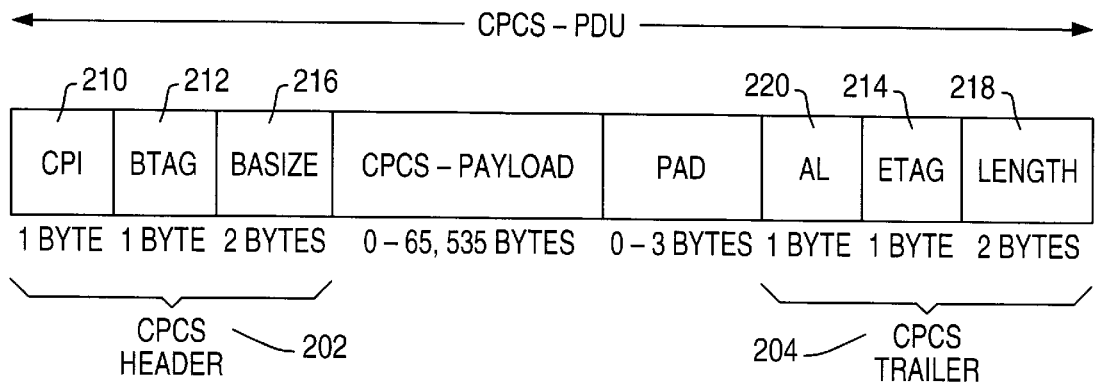
FIG. 4 PRIOR ART
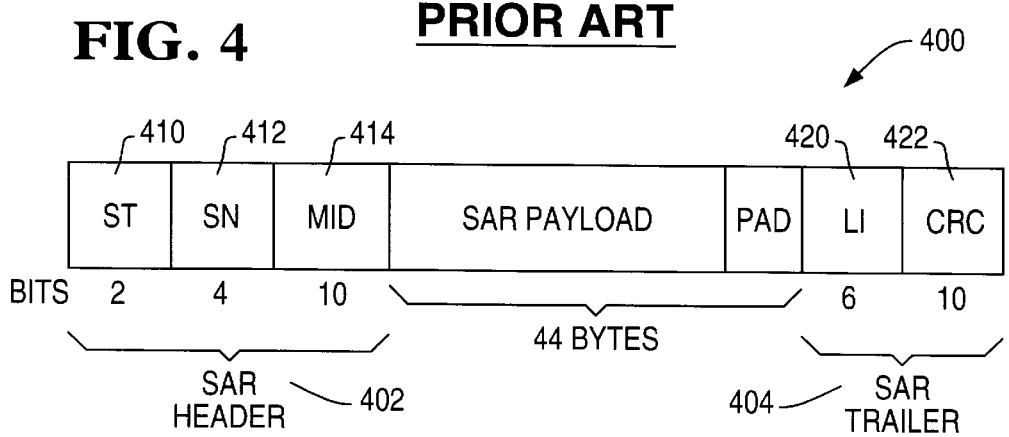
FIG. 5 PRIOR ART
| VALUE | NAME | MEANING |
|---|---|---|
| 0 | BOM | BEGINNING OF MESSAGE |
| 01 | COM | CONTINUATION OF MESSAGE |
| 10 | EOM | END OF MESSAGE |
| 11 | SSM | SIGNAL SEGMENT MESSAGE |

ATM REASSEMBLY CONTROLLER AND METHOD

BACKGROUND OF THE INVENTION

1. Field of the Invention

This invention relates in general to a device for reassembling ATM cells, and more particularly to an ATM reassembly controller that optimizes the utilization of host memory space and hardware resources such as I/O bus bandwidth, host memory bandwidth, memory system bandwidth and CPU resources.

2. Description of Related Art

ATM stands for "Asynchronous Transfer Mode". ATM has been chosen as a transport technology for the B-ISDN (Broadband Integrated Services Digital Network) protocol stack. The ATM technology is cell based and ATM networks are connection oriented. In addition, the connections are virtual and the connection identifiers do not have a global significance when compared to other networking technologies such as ethernet, token-ring, etc.

ATM networks are provisioned much the same as frame relay networks. Subscribers select access and port speeds and a sustained information rate (SIR), which is comparable to frame relay's committed information rate (CIR). For example, subscriber traffic can enter a carrier's ATM network at 45 Mbit/s with an SIR of 10 Mbit/s. The traffic is guaranteed to travel through the network at 10 Mbit/s but can burst to higher bit rates when network capacity is available.

Because ATM is ideal for switch cost and the fact that it is designed to carry voice, data and video, ATM is quickly becoming the favored Local Area Network (LAN) technology. As a result, many companies are now shipping ATM switches that are ATM based and provide translations to other LAN technologies such as Ethernet, Token ring, and T1. Further, ATM networks are already replacing most other WANs, MANs and LANs. It is also a minor addition to include the regular office telephone communications function in an ATM based link to the office.

One of the key features of ATM is that it spans the local and wide area. The technology begins with voice, data, and video, and then slices and dices them into 53-byte cells. The 53-byte cells are then transmitted over high-speed circuits. Intelligent end equipment takes care of segmentation and reassembly (SAR).

ATM cell reassembly refers to the reception of multiple 53 byte ATM cells, extraction of the payload which is normally 48 bytes, and combining the payloads of multiple cells to reconstruct the Protocol Data Unit (PDU) that was transmitted from the source. Typically, ATM cells received in a sample period are from many different virtual channels. Thus, the ATM reassembly controller must be able to reassemble PDUs for multiple channels in parallel. After completing the transfer of the entire PDU, the reassembly controller must report the event to the host CPU along with appropriate PDU descriptors.

The ATM PDU can be any size from 1 to 65,535 bytes. For the AAL-5 format, the reassembly controller does not know the size of the PDU until the last cell is received which has the Payload Type Indicator (PTI) bits set to indicate that the cell is the last cell of a PDU. Typical memory buffers are usually 4096 bytes in size.

Since ATM reassembly may involve thousands of small PDUs in a short period of time, previous reassembly controller designs employ the definition of a smaller memory buffer size, such as 128 bytes. The reassembly would begin by writing 48 byte payloads to a small buffer. The small buffer would overflow if the PDU was sufficiently large. In this situation, the reassembly controller would continue by starting to fill a large buffer. However, the PDU sizes vary and there is frequently unused areas of small and large buffers.

Furthermore, the efficient use of the I/O bus, host memory bus, memory system resources and CPU resources is another area of concern. The ATM cell payloads of 48 bytes are too small to efficiently transfer to host memory. The status information for the PDU is even smaller. Pointers to the buffers where the data is stored must also be conveyed to the application and these pointers are typically less than 48 bytes. Such small transfers needlessly tie-up the bus and host resources.

Thus, it can be seen that there is a need for a means to reassemble incoming ATM cells into PDUs and to pack the PDUs with status such that host memory saved.

It can also be seen that there is a need to reduce the host memory write operations for efficient use of system resources.

SUMMARY OF THE INVENTION

To overcome the limitations in the prior art described above, and to overcome other limitations that will become apparent upon reading and understanding the present specification, the present invention discloses an ATM reassembly controller that optimizes the utilization of host memory space and hardware resources such as I/O bus bandwidth, host memory bandwidth, memory system bandwidth and CPU resources.

The present invention solves the above-described problems by combining whenever possible the PDU status, PDU data and pointers to the host memory data buffers into a large burst write to the status queue. In addition, multiple status bundles are packed into a host memory buffer for efficient use of memory. An additional benefit of combining and packing information is that CPU resources are conserved by having combined the information the CPU must access into to a contiguous memory area.

A system in accordance with the principles of the present invention includes means for receiving ATM cells, processing means for identifying a virtual channel, stripping payloads from the ATM cells associated with the identified virtual channel, and building protocol data unit descriptor headers for the reassembled protocol data units, a plurality of local memory buffers for storing the payloads and protocol data unit descriptor headers, memory management means for assigning pointers to the local memory buffers and determining when a local memory buffer is full and transfer means for writing the content of a local memory buffer in a single burst to host memory for accessing by an application.

One aspect of the present invention is that the ATM reassembly controller further includes means for determining the state of the virtual channel.

Another aspect of the present invention is that the ATM reassembly controller may further include pointer means for placing a main memory buffer pointer at the tail of a reassembly descriptor list, determining means for determining whether the cell is the last cell in a protocol data unit; and second writing means for writing a PDU descriptor header to the reassembly descriptor list in response to determining that the cell is the last cell in a protocol data unit.

Another aspect of the present invention is that the means for determining the state of the virtual channel further comprises means for determining whether the controller is receiving or idle.

Another aspect of the present invention is that the means for determining whether the controller is receiving or idle further comprises means for identifying the received cell as a first cell in response to determining that the state of the virtual channel is idle.

Another aspect of the present invention is that the means for determining whether the controller is receiving or idle further comprises means for identifying the received cell as a last cell in response to reading a bit in the cell.

Still another aspect of the present invention is that the means for allocating a local memory buffer further comprises means for assigning a local memory buffer pointer for the local memory buffer.

Another aspect of the present invention is that the means for allocating a local memory buffer further comprises means for placing the pointer into a local memory reassembly address field of a reassembly connection table entry, the placing of the pointer changing the state of the virtual channel from idle to receiving.

Another aspect of the present invention is that the first writing means further comprises capacity determining means for determining whether all of the payload will fit in the local memory buffer.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 2 illustrates the structure of the CPCS-PDU for AAL 3/4;

FIG. 4 illustrates the structure of the SAR-PDU for AAL 3/4;

FIG. 5 is a table illustrating the values of the ST field;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an ATM reassembly controller that optimizes the utilization of host memory space and hardware resources such as I/O bus bandwidth, host memory bandwidth, memory system bandwidth and CPU resources. This is achieved by combining whenever possible the PDU status, PDU data and pointers to the host memory data buffers into a large burst write to the status queue. Multiple status bundles are packed into a host memory buffer for efficient use of memory. An additional benefit of combining and packing information is that CPU resources are conserved by having combined the information the CPU must access into to a contiguous memory area.

Figure 1:
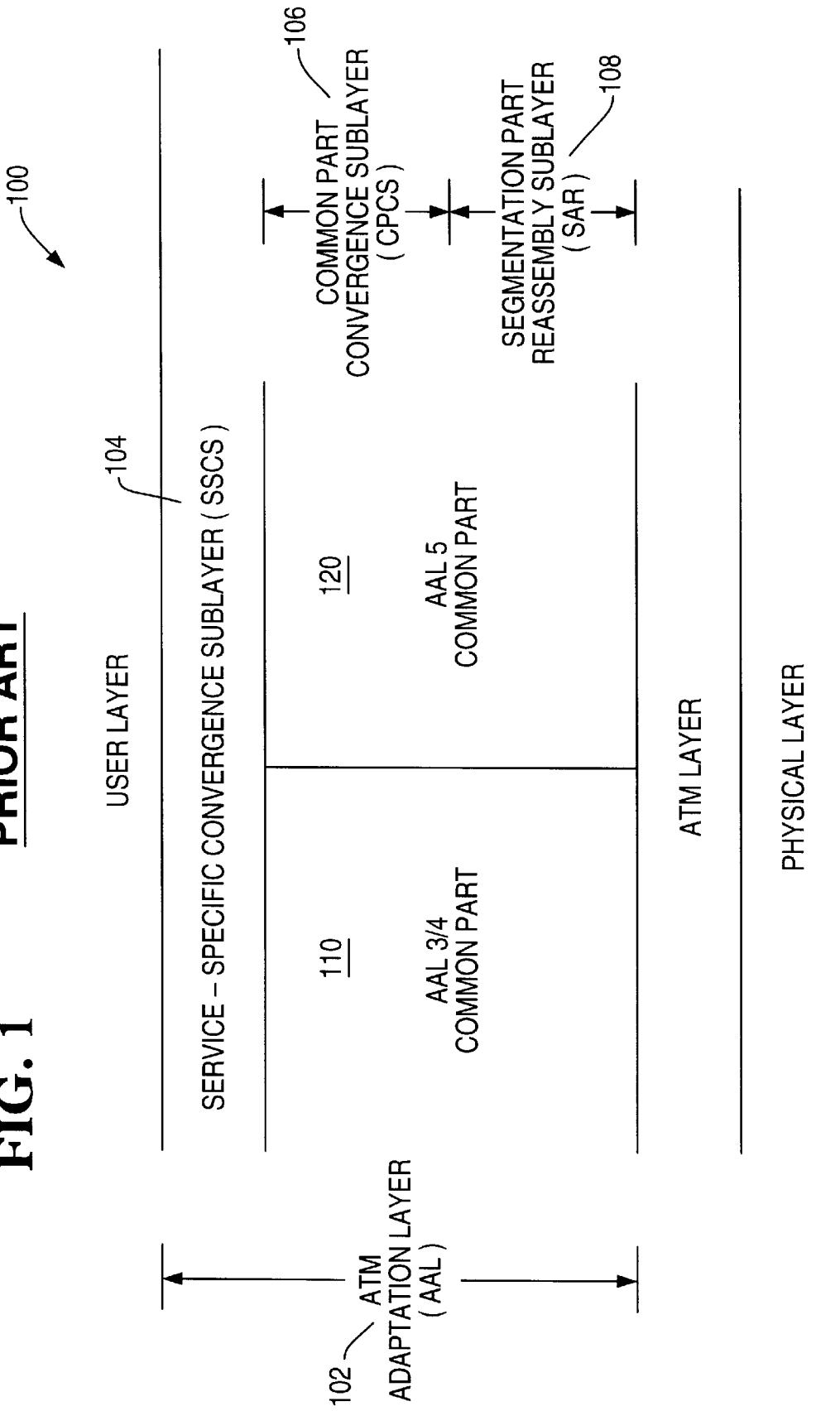
FIG. 1 illustrates the protocol model for the variable bit rate (i.e., packet based) ATM Adaptation Layer (AAL)

FIG. 1 illustrates the protocol model 100 for the variable bit rate (i.e., packet based) ATM Adaptation Layer (AAL). The present invention supports the reassembly functions required to achieve packet transmission across an ATM network. The AAL 102 is split into three sublayers. The Service Specific Convergence Sublayer (SSCS) 104 is used to add additional service features such as assured transfer (error correction by retransmission). The Service Specific Convergence Sublayer 104 may be a null sublayer for unassured transfer (i.e., error detection, but no correction). The Common Part Convergence Sublayer (CPCS) 106 performs error detection and control functions at the frame level. The third sublayer is the Segmentation and Reassembly Sublayer (SAR) 108 which performs the functions necessary to segment frames into ATM cells and reassemble a multiplexed stream of ATM cells back into their original frames.

Various AAL types, such as the AAL 3/4 common part 110, have been specified to implement the functions of the CPCS 106 and SAR 108 sublayers. Because ATM was designed to support all sorts of services, including voice, video, and data, it was felt that different services would have different AAL needs. Thus, four ATM adaptation layers 102 were originally defined: AAL 1 and AAL 2 were designed to support applications, like voice, that require guaranteed bit rates, while AAL 3 and AAL 4 were intended to provide support for packet data running over ATM. The idea was that AAL 3 would be used by connection-oriented packet services (such as X.25) and AAL 4 would be used by connectionless services (such as IP). Eventually, the reasons for having different AALs for these two types of service were found to be insufficient, and the AALs merged into one that is inconveniently known as AAL 3/4. Meanwhile, some perceived shortcomings in AAL 3/4 caused a fifth AAL to be proposed, called AAL 5. Thus there are now four AALs: 1,2, 3/4 and 5.

AAL 3/4 is intended for both connectionless and connection oriented variable bit rate services. The main function of AAL 3/4 is to provide enough information to allow variable length packets to be transported across the ATM network as a series of fixed length cells. That is, the AAL supports the segmentation and reassembly process.

FIG. 2 illustrates the structure of the CPCS-PDU 200. The CPCS-PDU 200 defines a way of encapsulating variable length PDUs prior to segmenting them into cells. The PDU passed down to the AAL layer is encapsulated by adding a header 202 and a trailer 204, and the resultant CPCS-PDU 200 is segmented into ATM cells. The CPCS-PDU format begins with an 8-bit common part indicator (CPI) 210, which is like a version field, indicating which version of the CS-PDU format is in use. The next 8 bits contain the 'beginning tag' (Btag) 212, and it is supposed to match the 'end tag' (Etag) 214 for a given PDU. This protects against the situation where the loss of the last cell of one PDU and the first cell of another causes two PDUs to be inadvertently joined into a single PDU and passed up to the next layer in the protocol stack. The BASize field (Buffer Allocation size) 216 is not necessarily the length of the PDU 218 (which appears in the trailer); BASize 216 is supposed to be a hint to the reassembly process as to how much buffer space to allocate for the reassembly. The reason for not including the actual length here is that the sending host might not have known how long the CS-PDU was when it transmitted the header. The CPCS-PDU trailer 204 contains the Etag 214, the real length of the PDU 218, and AL Alignment octet 220.

Figure 3:
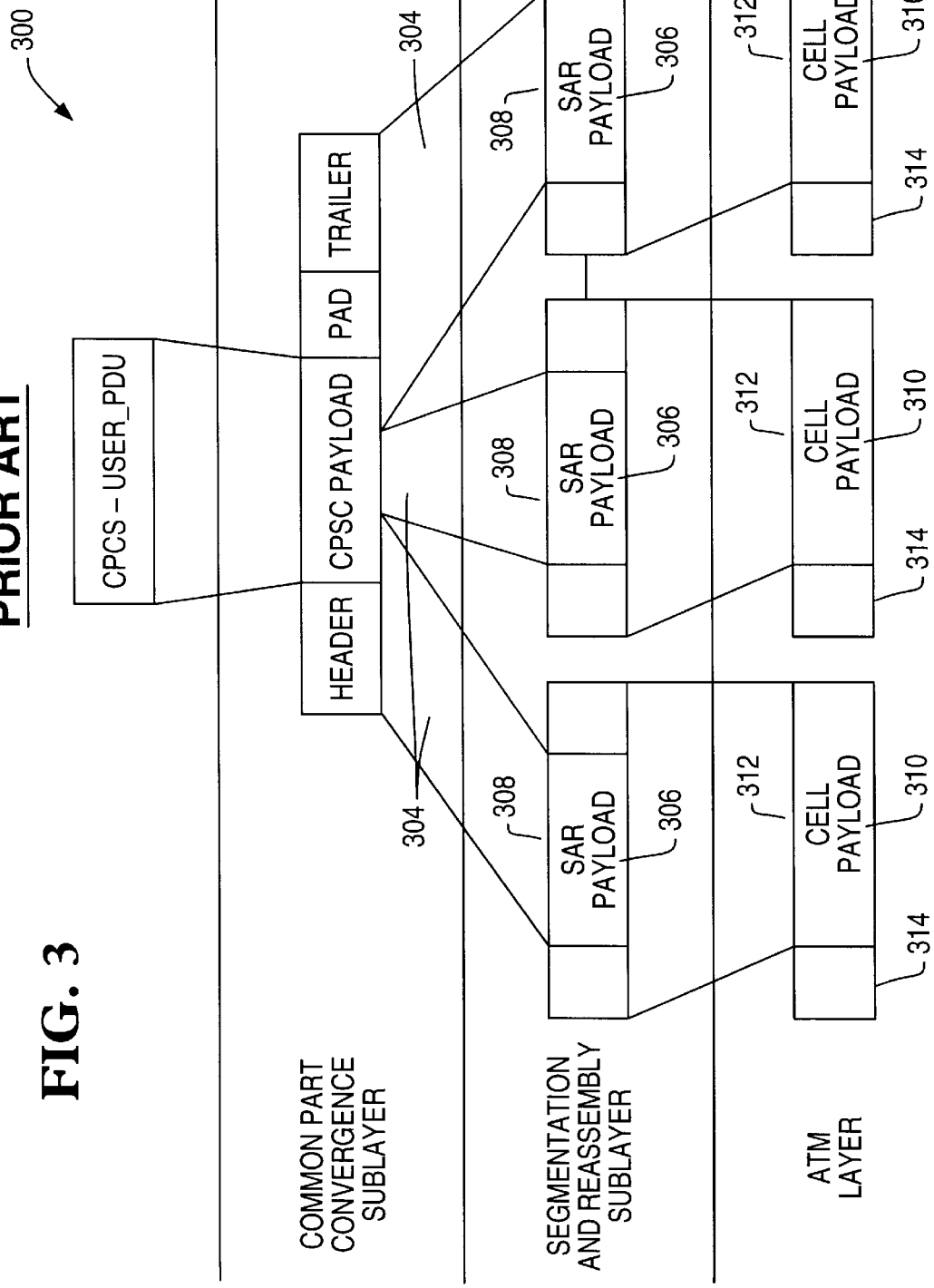
FIG. 3 illustrates the segmentation/reassembly process for AAL 3/4.

FIG. 3 illustrates the segmentation/reassembly process 300 for AAL 3/4. The CPCS-PDU 302 is segmented into 44-byte segments 304. Each segment 304 forms the payload 306 of a SAR-PDU 308. Each SAR-PDU 308 then forms the 48-byte cell payload 310 of an ATM cell 312. Each ATM cell 312 has a five-byte cell header 314.

FIG. 4 illustrates the structure of the SAR-PDU 400 for AAL 3/4. The SAR-PDU 400 includes a SAR header 402 and SAR trailer 404. The SAR header 402 includes the ST 410, SN 412 and MID 414 fields. The SAR trailer 404 includes a length indicator (LI) 420 and cyclic redundancy check (CRC) 422. The segment type (ST) field 410 indicates whether the cell is a beginning of message (BOM), continuation of message (COM), or end of message (EOM) cell, or whether it contains a complete CPCS-PDU (SSM). FIG. 5 is a table 500 illustrating the value 502 of the ST field for a beginning of message (BOM) 504, continuation of message (COM) 506, end of message (EOM) 508 cell, or complete CPCS-PDU (SSM) 510.

Referring again to FIG. 4, the sequence number (SN) 412 is incremented modulo-16 for successive SAR-PDU on the same virtual connection (regardless of packet boundaries). The message identification (MID) field 414 has the same value for all SAR-PDUs derived from the same CPCS-PDU. The message identification field 414 may be used to form part of the reassembly identifier to demultiplex and reassemble cells from multiple interleaved packets. The length indicator (LI) 420 gives the length of the SAR-PDU payload in bytes. The CRC 422 is a cyclic redundancy check computed over the entire SAR-PDU and is used for error detection.

From the above description, it is clear that AAL 3/4 requires a lot of fields, and thus a lot of overhead to perform the conceptually simple function of segmentation and reassembly. This observation was, in fact, made by several people in the early days of ATM, and led to the standardization of AAL 5.

AAL 5 supports connection-oriented variable bit rate data services. It is a substantially lean AAL compared with AAL 3/4 at the expense of error recovery and built in retransmission. This tradeoff provides a smaller bandwidth overhead, simpler processing requirements, and reduced implementation complexity. Some organizations have proposed AAL 5 for use with both connection-oriented and connectionless services.

AAL 5 is also a mechanism for segmentation and reassembly of packets. That is, it is a rulebook which sender and receiver agree upon for taking a long packet and dividing it up into cells. The sender's job is to segment the packet and build the set of cells to be sent. The receiver's job is to verify that the packet has been received intact without errors and to put it back together again. As illustrated in FIG. 1, AAL 5 like any other AAL 102, is composed of a common part (CPCS) 120 and a service specific part (SSCS) 104. The common part is further composed of a convergence sublayer (CS) 106 and a segmentation and reassembly (SAR) sublayer 108. The SAR sublayer 108 segments a CPCS-PDU into 48 byte chunks that are fed into the ATM layer to generate 53 byte cells (carried on the same VCI).

Figure 6:
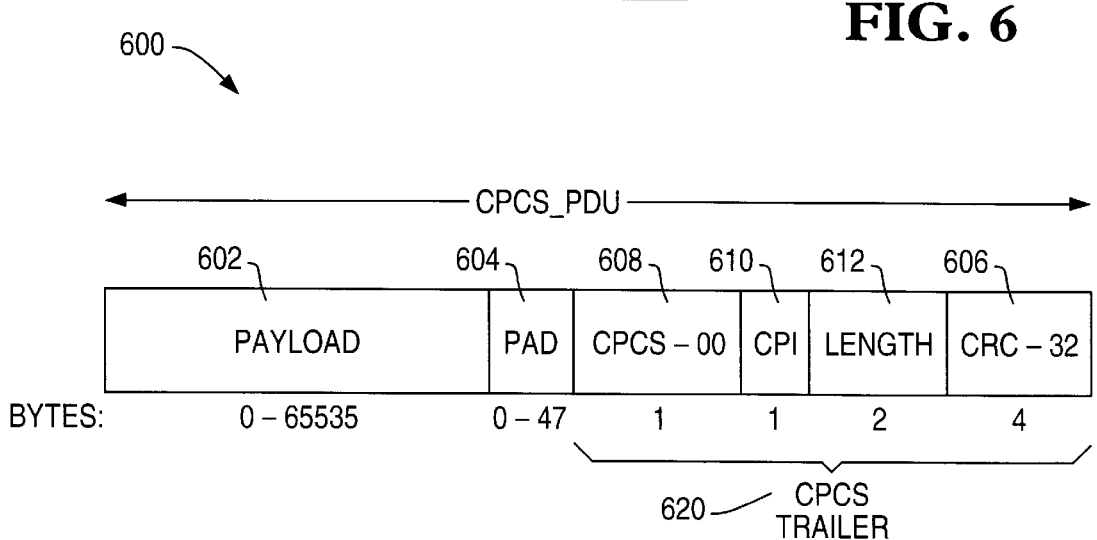
FIG. 6 illustrates the structure of the CPCS-PDU for AAL 5.

FIG. 6 illustrates the structure 600 of the CPCS-PDU for AAL 5. The CPCS-PDU payload 602 is a variable length field containing 0–65,535 bytes of CPCS user information. The PAD field 604 is used to align the CPCS-PDU to a 48-byte boundary. The PAD field 604 may contain any value, and it is included in the CRC-32 calculation 606 in the CPCS trailer 620. The CPCS-00 field 608 is used to identify the user payload. The common part indicator (CPI) 610 has not been fully defined. The length field 612 indicates the length in bytes of the payload filed.

Figure 7:
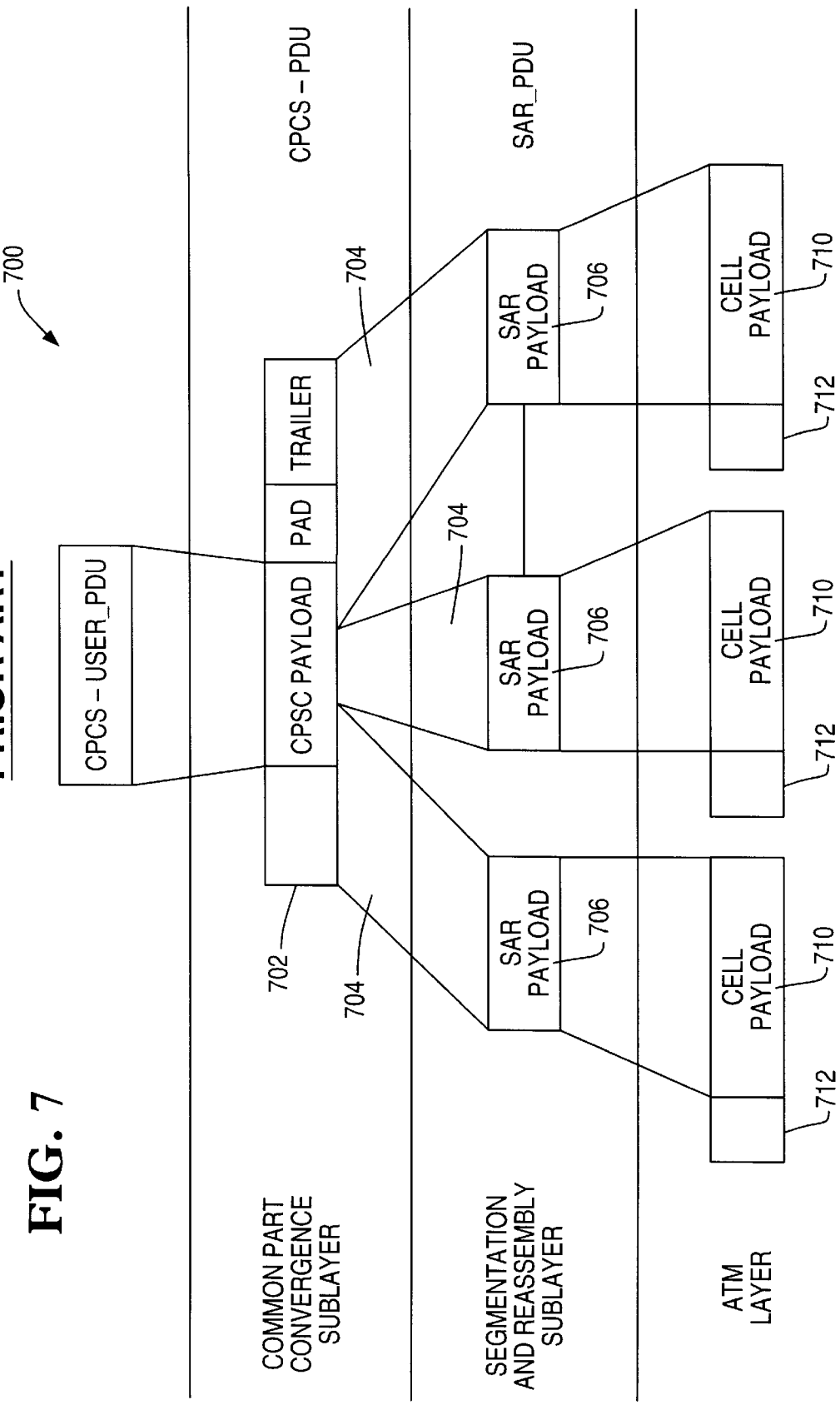
FIG. 7 illustrates the segmentation/reassembly process for AAL 5.

FIG. 7 illustrates the segmentation/reassembly process 700 for AAL 5. The CPCS-PDU 702 is segmented into 48-byte segments 704, with each segment 704 forming a SAR-PDU 706. No SAR-PDUs 706 are partially filled since the CPCS-PDU 702 is assigned to a 48 byte boundary. The is no SAR header or trailer on the SAR-PDU 706. Each SAR-PDU 706 forms the 48-byte payload 710 of an ATM cell. Each ATM cell has a five-byte header 712. An ATM user-to-user indication is available in the payload type field of the ATM cell header 712. AAL 5 uses an ATM user-to-user indication of "1" to indicate the last SAR-PDU 706 of a CPCS-PDU 702. All other SAR-PDUs 706 are carried in ATM cells with an ATM user-to-user indication of "0".

Figure 8:
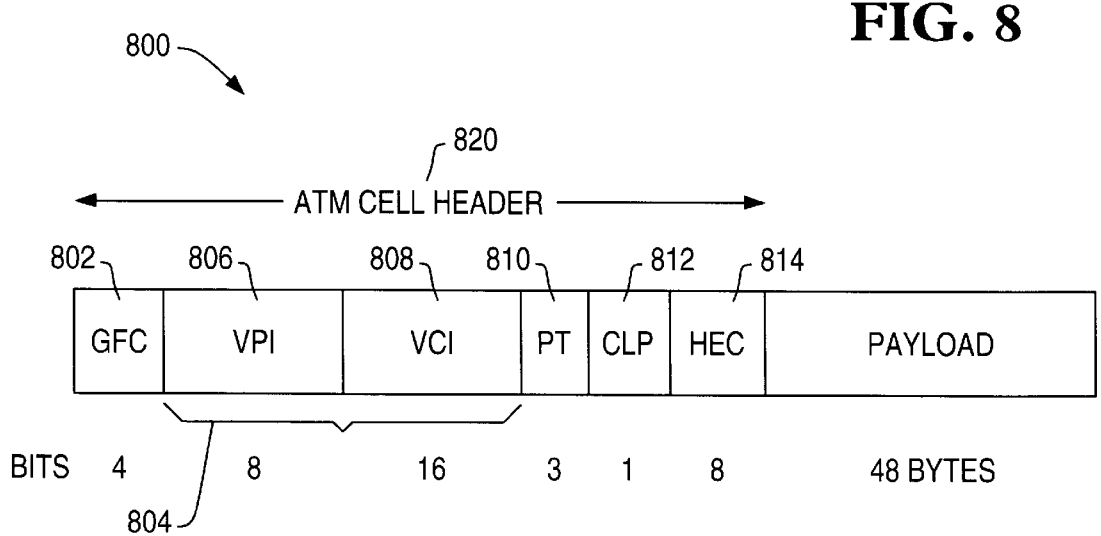
FIG. 8 illustrates the format of the ATM cell at the user network interface of an ATM network.

FIG. 8 illustrates the format of the ATM cell 800 at the user network interface of an ATM network. The generic flow control field (GFC) 802 is used to ensure fair and efficient access between multiple devices sharing a single user network interface. A label space 804 of 24 bits is provided, divided into two fields: an eight-bit virtual path identifier (VPI) 806, and a 16-bit virtual channel identifier (VCI) 808. The VPI 806 allows a group of virtual connections, called a virtual path, to be identified and the VCI 808 identifies the individual virtual connections within each virtual path. The payload type (PT) field 810 is used to distinguish user information and network information. For user information cells, the payload type field 810 carries a single bit ATM user-to-user identification. ATM cells with a payload type field 810 that indicates network information may be inserted by the segmentation entity and filtered by the reassembly entity. The cell loss priority (CLP) bit 812 permits two priorities of cell to be defined where the network may discard low priority cells under congestion conditions. The header error check (HEC) field 814 provides an eight-bit cyclic redundancy check on the contents of the cell header 820.

Figure 9:
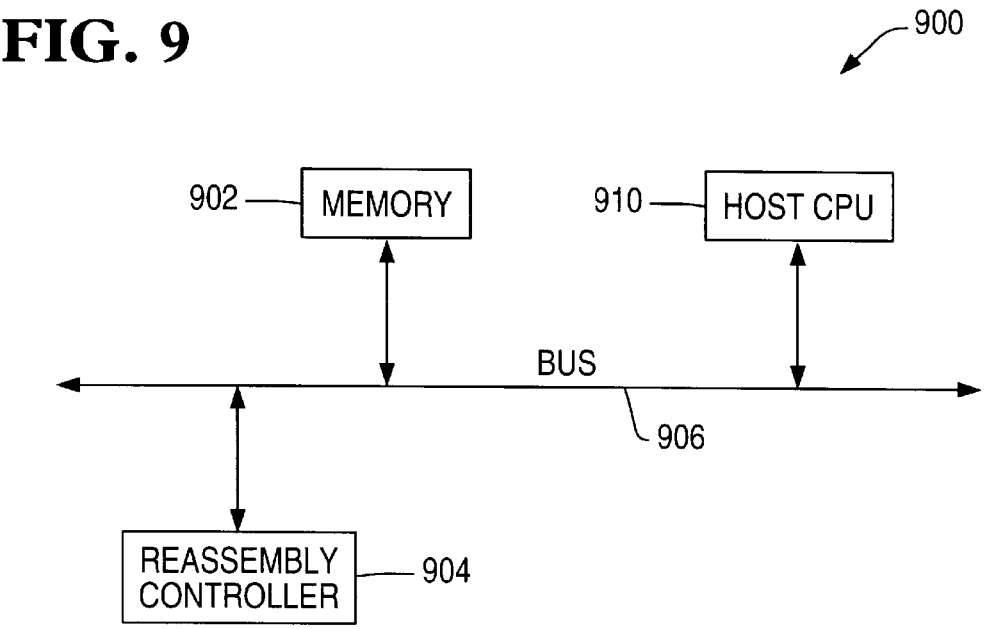
FIG. 9 illustrates a block diagram of a prior art segmentation and reassembly (SAR) device.

FIG. 9 illustrates a block diagram 900 of a system for performing and reassembly of ATM cells as commonly used. Previous reassembly controller designs employed smaller memory buffers, such as 128 bytes. The buffers are contained in the packet memory 902. The reassembly would begin by the SAR writing 48 byte payloads to the small buffer in the packet memory 902. If the small buffer overflows, the reassembly controller 904 continue by starting to fill a large buffer. Nevertheless, frequently unused areas of small and large buffers occur due to variation in PDU sizes.

Furthermore, the efficient use of the bus 906, memory system resources 902 and CPU resources 910 is another area of concern. The ATM cell payloads of 48 bytes are too small to efficiently transfer to memory 902. The status information for the PDU is even smaller. Pointers to the buffers where the data is stored must also be conveyed to the application and these pointers are typically less than 48 bytes. Such small transfers needlessly tie-up the bus 906 and host resources.

Figure 10:
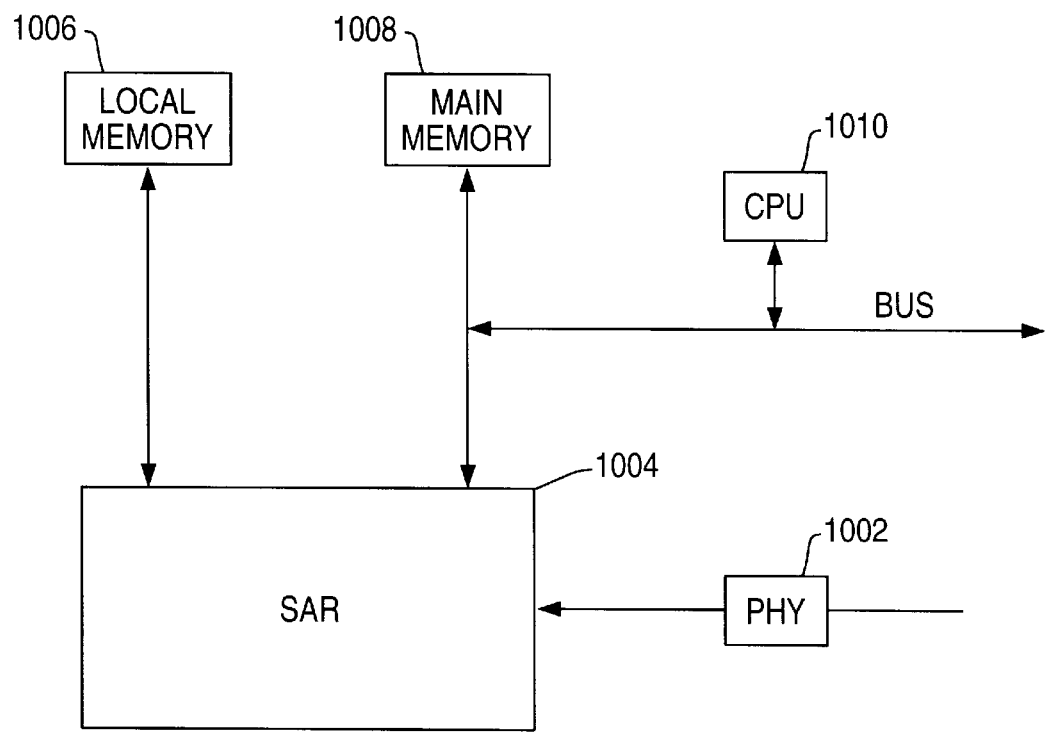
FIG. 10 illustrates a block diagram of the reassembly device according to the present invention.

FIG. 10 illustrates a block diagram 1000 of the reassembly device according to the present invention. ATM cells are received through the PHY 1002 and routed to the SAR 1004. Reassembly of PDUs occurs in local memory buffers 1006. The size of the local memory buffer is chosen so that when the buffer is full, it holds the optimum amount of data for a burst write to main memory 1008 for the host cpu 1010. A typical buffer size is 512 bytes. The invention provides that if the entire PDU plus the PDU status information (assume 20 bytes) is smaller than 512 bytes (512−20=492 bytes), then the status will be added to the PDU buffer and the contents of the local memory buffer 1006 will be written to main memory 1008 one burst write to a status queue therein.

To achieve efficient transfers, burst writes must be employed where the first bus cycle provides the address and as many as 128 following bus cycles are data (4 byte wide data bus). The receiving memory increments the address to determine where the data must be stored.

An additional feature is the status queue in main memory 1008 is an infinite linked list of large memory buffers (typically 4096 bytes). These features have several benefits. Combining the status and small PDU combines two writes into one larger burst write to host memory 1008. For efficient use of memory the status and PDU of multiple small PDUs are packed into a 4096 byte buffer of the status queue. This packing is important because Operations and Maintenance (OAM) cells and raw cell PDUs are only 48 bytes, Address Resolution Protocol (ARP) PDUs for Local Area Network Emulation (LANE) are typically 96 bytes and commands for LANE are typically 200 bytes. An additional benefit is that the software has immediate access to the PDU and does not have to jump to a different memory buffer address that may cost considerable CPU resources if there is page miss in the CPU address translation lookup buffer.

The infinite linked list of large memory buffers eliminates messages between the CPU and the reassembly controller that were required in previous designs that used rings for the status queue. Rings require the host and reassembly controller to communicate to prevent over writing useful information.

If the PDU is slightly larger than one memory buffer (4096+492 bytes), the status will be combined in local buffer memory 1006 with the pointer to the local memory buffer plus the remaining data bytes and this will be written as one burst to the status queues in main memory 1008. This is important because most large PDU transfers are equal to the memory page size plus a small TCP/IP or UDP/IP header and would normally use only a small amount of a second host memory buffer. This feature also combines the status write and the write of the overflow data into one larger burst write from local memory 1006 to host memory 1008.

Further, for very large PDUs that fill multiple host memory buffers, the reassembly controller manages the pointers to those host memory buffers locally 1006 and when the PDU is completely received it combines the status and all pointers into one burst write to the status queue in host memory 1008. Previous designs would transfer one pointer at a time. Collecting the status and all pointers in one contiguous memory write combines multiple small writes into one large burst write and also saves CPU resources from collecting pointers and status.

Figure 11:
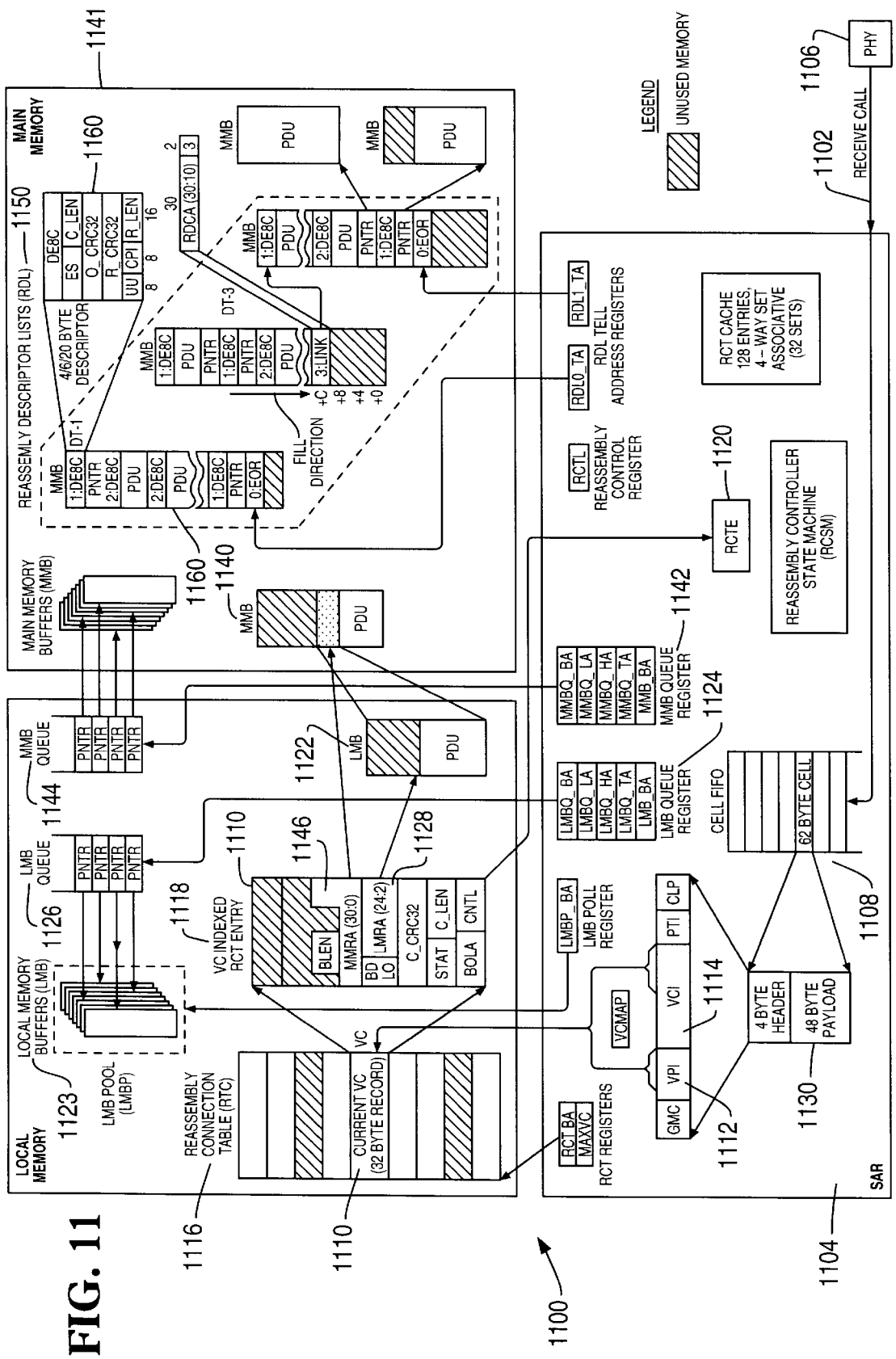
FIG. 11 illustrates a detailed block diagram of the present invention.

FIG. 11 illustrates a detailed block diagram 1100 of the present invention. A cell is received 1102 at the SAR 1104 via the PHY 1106. The received cell 1102 is placed in a cell FIFO 1108. Using the received cell 1102, the virtual channel number 1110 is determined using the VPI 1112 and VCI 1114. The virtual channel number 1110 is used to index into the reassembly connection table 1116 and the reassembly connection table entry 1118 for the VC 1110 is fetched from the RCT 1116 and placed into the RCTE 1120 in the SAR 1104. The RCTE 1118 for a VC 1110 determines the current state of the VC 1110, which is either idle (state 0), local memory pointer valid (state 1), or local and main memory pointers are valid (state 2). If the local memory pointer is valid (state 1 or 2), then the VC 1110 is in the receiving state. If the VC 1110 is in the idle state, then the cell received 1102 is interpreted as the first cell of the PDU. If PTI bit 0 is set to a 1 (SDU type 1), then the cell 1102 is interpreted as the last cell of the PDU.

If the VC 1110 is idle, then a local memory buffer 1122 is allocated from the local buffer pool 1123 by removing a pointer from the head of the local memory buffer pointer queue (LMBQ) 1126 in local memory, decribed by the LMBQ registers 1124. The pointer is placed into the local memory reassembly address (LMRA) 1128 field of the reassembly connection table entry 1120. This updates the state of the VC 1110 to state 1.

If the VC 1110 is not idle, and if the number of bytes left in the local memory buffer 1122 is not greater than or equal to 48, then the portion of the payload 1130 that will fit in the local memory buffer 1122 is stored therein. If either the VC 1110 is not in state 2 (already have a main memory buffer pointer) or the local memory buffer 1122 is full, then a main memory buffer 1140 is allocated from the main memory buffer pool 1141 by removing a pointer from the head of the main memory buffer pointer queue (MMBQ) 1144 in local memory, described by the MMBQ registers 1142. The pointer is placed into the main memory reassembly address (MMRA) field 1146 of the reassembly connection 1120 table entry. The state of the VC 1110 is now updated to state 2.

If the VC is in state 2 (already have a main memory buffer pointer) and the main memory buffer 1140 is not full, then a DMA is performed to move the entire contents of the local memory buffer 1122 into the main memory buffer 1140 addressed by the MMRA 1146. A new local memory buffer 1122 is allocated from the LMB pool 1123. If the main memory buffer 1140 has been completely filled, then a DMA is performed to place the main memory buffer pointer at the tail of the reassembly descriptor list (RDL) 1150.

When the number of bytes left in the local memory buffer 1122 is greater than or equal to 48, the remaining bytes from the payload 1130 are stored to the local memory buffer 1122. If this is not the last cell of the PDU then the reassembly controller 1100 simply waits for the next cell. When the VC 1110 is in state 1, a main memory buffer 1140 is allocated. Then a DMA is performed to move the contents of the local memory buffer 1122 into the main memory buffer 1140 addressed by the MMRA 1146. A new local memory buffer 1122 is allocated from the LMB pool 1123.

If the VC is in state 1 and the PDU descriptor header 1160 fits into the local memory buffer 1122, the PDU descriptor header is stored to the local memory buffer 1122 and a DMA is performed to place the PDU descriptor 1160 to the tail of the RDL 1150. Furthermore, if the VC 1110 is in the state 2, the main memory buffer 1140 is full, and the descriptor head 1160 will fit into the local memory buffer 1122, the PDU descriptor head 1160 is stored to the local memory buffer 1122 and a DMA is performed to place the PDU descriptor 1160 in the local memory buffer 1122 to the tail of the RDL 1150. In either case, the state of the VC 1110 is now updated to state 0 (idle). The reassembly controller then waits for the next cell prior to starting again.

Figure 12A:
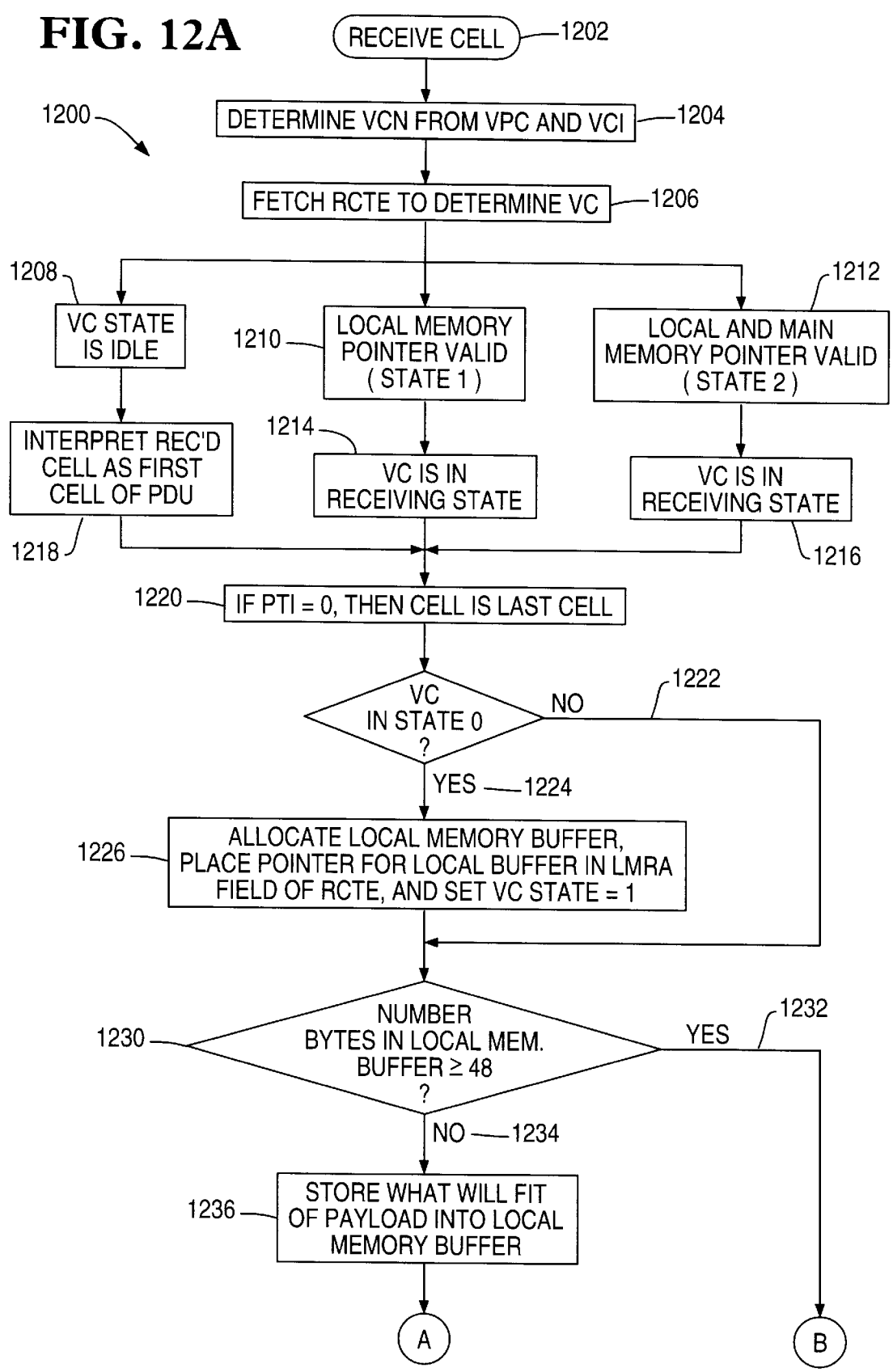
FIGS. 12a and 12b are a flow chart illustrating the operation of the reassembly controller.
Figure 12B:
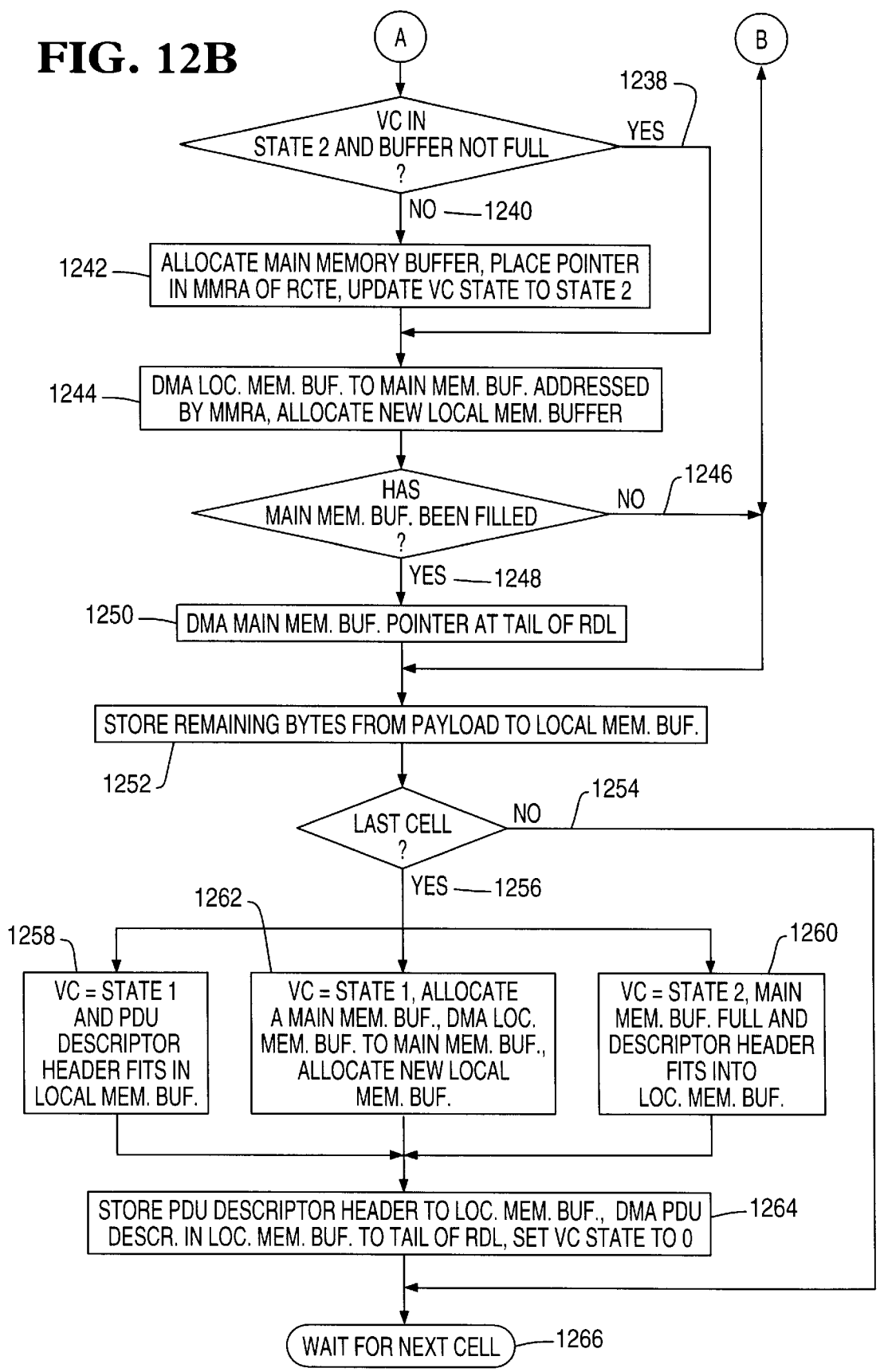

The operation of the reassembly controller will be described with reference to the flow chart 1200 of FIGS. 12a–12b. When a cell is received 1202, the virtual channel number is first determined 1204: VCN=f(VPI, VCI). Next, the reassembly connection table entry for the VC is fetched 1206: RCTE=RCT[VCN]. The RCTE for a VC determines the current state of the VC, which is either idle (state 0) 1208, local memory pointer valid (state 1) 1210, or local and main memory pointers are valid (state 2) 1212. If the local memory pointer is valid (state 1 1210 or 2 1212), then the VC is in the receiving state 1214, 1216. If the VC is in the idle state 1208, then the cell received is interpreted as the first cell of the PDU 1218. If PTI bit 0 is set to a 1 (SDU type 1), then the cell is interpreted as the last cell of the PDU 1220.

If the VC is not in state 0 (idle) 1222, then step two 1230 is performed. Otherwise 1224, a local memory buffer is allocated by removing a pointer from the head of the local memory buffer pointer queue (LMBQ), the pointer is placed into the local memory reassembly address (LMRA) field of the RCTE, and the state of the VC is updated to state 1 1226. Step two 1230 is performed.

In step two 1230, if the number of bytes left in the local memory buffer is greater than or equal to 48 1232, then step four is executed. Otherwise 1234, what will fit of the pay load is stored into the local memory buffer 1236. If the VC is in state 2 (already have a main memory buffer pointer) and the buffer is not full 1238, then step three is executed 1244. Otherwise 1240, a main memory buffer is allocated by removing a pointer from the head of the main memory buffer pointer queue (MMBQ), the pointer is placed into the main memory reassembly address (MMRA) field of the RCTE, and the state of the VC is updated to state 2 1242.

In step three 1244, a DMA is performed to move the entire contents of the local memory buffer into the main memory buffer addressed by the MMRA, and new local memory buffer is allocated from the LMBQ. If the main memory buffer has not been completely filled 1246, then step four 1252 is executed. Otherwise 1248, a DMA is performed to place the main memory buffer pointer at the tail of the reassembly descriptor list (RDL) 1250.

In step four 1252, the remaining bytes from the payload are stored to the local memory buffer. If this is not the last cell of the PDU 1254 then step six 1266 is executed. If the VC is in state 1 and the PDU descriptor header will into the local memory buffer 1258 step five 1264 is executed. If the VC is in the state 2, the main memory buffer is full, and the descriptor head will fit into the local memory buffer 1260, step five 1264 is executed. If the VC is in state 1, then a main memory buffer is allocated, a DMA is performed to move the contents of the local memory buffer into the main memory buffer addressed by the MMRA, and a new local memory buffer is allocated from the LMBQ 1262. Then step five 1264 is executed.

In step five 1264, the PDU descriptor head is stored to the local memory buffer, a DMA is performed to place the PDU descriptor that was built in the local memory buffer to the tail of the RDL, and the state of the VC is updated to state 0 (idle). Step 6 1266 is then executed.

In step six 1266, the reassembly controller waits for the next cell prior to starting again at step one.

Accordingly, the ATM reassembly controller optimizes the utilization of host memory space and hardware resources such as I/O bus bandwidth, host memory bandwidth, memory system bandwidth and CPU resources by combining whenever possible the PDU status, PDU data and pointers to the host memory data buffers into a large burst write to the status queue. In addition, multiple status bundles are packed into a host memory buffer for efficient use of memory. An additional benefit of combining and packing information is that CPU resources are conserved by having combined the information the CPU must access into to a contiguous memory area.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An ATM reassembly controller for reassembling ATM cells into protocol data units for storage in main memory having main memory buffers and reassembly descriptor lists, comprising:

an input port for receiving an ATM cell;

a processor, operatively coupled to the input port, for identifying a virtual channel for the ATM cell, stripping a payload from the ATM cell associated with the identified virtual channel, and building a protocol data unit descriptor header for a reassembled protocol data unit constructed with the payload from the ATM cell;

a local memory buffer, coupled to the processor, for storing the payload and protocol data unit descriptor header;

a memory manager, operatively coupled to the processor, for assigning pointers to the local memory buffer and determining when the local memory buffer is full; and a memory access controller, operatively coupled to the local memory buffer, for writing the content of the local memory buffer in a single burst to host memory for accessing by an application in response to determining that the local memory buffer is full.

2. The ATM reassembly controller of claim 1 further comprising a virtual channel indicator for indicating the state of the virtual channel.

3. The ATM reassembly controller of claim 1 further comprising:

a pointer controller for placing a main memory buffer pointer at the tail of the reassembly descriptor list in main memory;

a last cell indicator for indicating whether the cell is the last cell in the protocol data unit; and second writing means for writing a PDU descriptor header to the reassembly descriptor list in response to determining that the cell is the last cell in the protocol data unit.

4. The ATM reassembly controller of claim 1 wherein the virtual channel indicator further comprises an activity indicator for determining whether the controller is receiving or idle.

5. The ATM reassembly controller of claim 4 wherein the activity indicator further comprises a first identifier for identifying the received cell as a first cell in response to determining that the virtual channel is idle.

6. The ATM reassembly controller of claim 4 wherein the activity indicator further comprises a second indicator for identifying the received cell as a last cell in response to reading a bit in the cell.

7. The ATM reassembly controller of claim 1 further comprising a local memory buffer allocator for assigning a local memory buffer pointer for a new local memory buffer.

8. The ATM reassembly controller of claim 7 further comprising a reassembly connection table entry having a reassembly address field for placing of the pointer, the placing of the pointer changing the state of the virtual channel from idle to receiving.

9. The ATM reassembly controller of claim 1 wherein the memory access controller further comprises a capacity indicator for determining whether all of the payload will fit in the local memory buffer.

10. An ATM reassembly controller, comprising:
   an input port for receiving a cell;
   a register, operatively coupled to the input port, for determining a virtual channel associated with the received cell;
   a local memory buffer allocator, coupled to the register, for allocating a local memory buffer and for storing in the local memory buffer a payload stripped from the received cell;
   a main memory buffer allocator, operatively coupled to the local memory buffer allocator for allocating a main memory buffer; and
   a memory access controller, coupled to the local memory buffer, for writing the contents of the local memory buffer into the main memory buffer in a single burst write operation.

11. The ATM reassembly controller of claim 10 further comprising an indicator for indicating a state for the virtual channel.

12. The ATM reassembly controller of claim 10 further comprising:
   a reassembly descriptor list for storing a main memory buffer pointer; and
   a first identifier for identifying whether the cell is the last cell in a protocol data unit;
   wherein the memory access controller writes a PDU descriptor header to the reassembly descriptor list in response to determining that the cell is the last cell in a protocol data unit.

13. The ATM reassembly controller of claim 11 wherein the indicator for indicating the state of the virtual channel further comprises an activity indicator for determining whether the controller is receiving or idle.

14. The ATM reassembly controller of claim 13 wherein the activity indicator further comprises a second identifier for identifying the received cell as a first cell in response to determining that the state of the virtual channel is idle.

15. The ATM reassembly controller of claim 13 wherein the first identifier identifies the received cell as a last cell by reading a bit in the cell.

16. The ATM reassembly controller of claim 10 wherein the local memory buffer allocator further comprises a pointer register for assigning a local memory buffer pointer for the local memory buffer.

17. The ATM reassembly controller of claim 16 wherein the local memory buffer allocator further comprises a reassembly connection table entry having a reassembly address field for placing the pointer, the placing of the pointer changing the state of the virtual channel from idle to receiving.

18. The ATM reassembly controller of claim 10 wherein the memory access controller further comprises a capacity indicator for indicating whether all of the payload will fit in the local memory buffer.

19. A method of reassembling ATM cells, comprising the steps of:
   receiving a cell;
   determining a virtual channel number associated with the received cell;
   determining the state of the virtual channel;
   allocating a local memory buffer for storing a payload stripped from the received cell associated with the virtual channel;
   storing the payload in a local memory buffer;
   allocating a main memory buffer; and
   writing the contents of the local memory buffer into the main memory buffer in a single burst write operation.

20. The method of claim 19 further comprising the steps of:
   placing a main memory buffer pointer at the tail of a reassembly descriptor list;
   determining whether the cell is the last cell in a protocol data unit; and
   writing a PDU descriptor header to the reassembly descriptor list in response to determining that the cell is the last cell in a protocol data unit.

21. The method of claim 19 wherein the step of determining the state of the virtual channel further comprises the step of determining whether the controller is receiving or idle.

22. The method of claim 21 wherein the step of determining whether the controller is receiving or idle further comprises the step of identifying the received cell as a first cell in response to determining that the state of the virtual channel is idle.

23. The method of claim 21 wherein the step of determining whether the controller is receiving or idle further comprises the step of identifying the received cell as a last cell in response to reading a bit in the cell.

24. The ATM reassembly controller of claim 19 wherein the step of allocating a local memory buffer further comprises the step of assigning a local memory buffer pointer for the local memory buffer.

25. The method of claim 24 wherein the step of allocating a local memory buffer further comprises the step of placing the pointer into a local memory reassembly address field of a reassembly connection table entry, the placing of the pointer changing the state of the virtual channel from idle to receiving.

26. The method of claim 19 wherein the step of writing further comprises the step of determining whether all of the payload will fit in the local memory buffer.

27. The method of claim 26 wherein the step of determining whether all of the payload will fit in the local memory buffer occurs before the payload is stored in the local memory buffer.

\* \* \* \* \*